United States Patent [19]

Willsie

[11] Patent Number: 5,120,940
[45] Date of Patent: Jun. 9, 1992

[54] DETECTION OF BARCODES IN BINARY IMAGES WITH ARBITRARY ORIENTATION

[75] Inventor: Todd D. Willsie, Seattle, Wash.

[73] Assignee: The Boeing Company, Seattle, Wash.

[21] Appl. No.: 565,668

[22] Filed: Aug. 10, 1990

[51] Int. Cl.$^5$ .......................... G06K 7/10; G06K 9/20; G06K 9/40

[52] U.S. Cl. ...................... 235/462; 382/48; 382/54

[58] Field of Search ............... 235/454, 455, 462; 358/135, 136, 138, 140; 382/9, 16, 19, 22, 28, 48, 54

[56] References Cited

U.S. PATENT DOCUMENTS

| | | | |
|---|---|---|---|
| 3,868,634 | 2/1975 | Dolch | 235/462 |
| 4,125,765 | 11/1978 | Cowardin et al. | 235/463 |
| 4,525,859 | 6/1985 | Bowles et al. | 382/5 |
| 4,541,116 | 9/1985 | Lougheed | 382/49 |
| 4,668,995 | 5/1987 | Chen et al. | 358/282 |
| 4,809,351 | 2/1989 | Abromovitz et al. | 235/474 |
| 4,822,986 | 4/1989 | Guthmueller et al. | 235/456 |
| 4,873,426 | 10/1989 | Sarna et al. | 235/462 |
| 4,907,156 | 3/1990 | Doi et al. | 382/19 |
| 4,948,955 | 8/1990 | Lee et al. | 235/462 |
| 5,038,381 | 8/1991 | Nelson | 382/9 |

FOREIGN PATENT DOCUMENTS 1-321583 12/1989 Japan.

Primary Examiner—Stuart S. Levy
Assistant Examiner—Edward H. Sikorski
Attorney, Agent, or Firm—Donald J. Lisa

[57] ABSTRACT

The location and orientation of a barcode block is determined by first producing an image of the document that excludes the barcode block and producing a second image wherein the spaces in the barcode block have been deleted thereby providing a solid rectangular block. The two images are subtracted to reject large background clutter while displaying with certainty the full image of the barcode block. Thereafter, down-sampling occurs to remove small clutter and other non-barcode objects while locating the centroid of each barcode block. The image containing the centroid is up-scaled and used to calculate the position of the barcode block in the original document for use by a barcode reader.

13 Claims, 3 Drawing Sheets

DETECTION OF BARCODES IN BINARY IMAGES WITH ARBITRARY ORIENTATION

This invention relates to barcode detection systems, and more particularly, to a method of accurately determining the location of one or more barcodes on a document.

BACKGROUND OF INVENTION

When a barcode symbol is included within a document containing other information, there are two problems. The first is how to identify the barcode location. The second problem relates to reading the thus located barcode data. The present invention addresses only the first problem, and is mainly concerned with how to distinguish the barcode from other markings such as printed matter on the document.

One prior technique for locating and reading a barcode is disclosed in Sarna et al, U.S. Pat. No. 4,873,426 where scanning is in a direction generally perpendicular to the orientation of the code bars. Such scanning is on a row-by-row basis to identify rows above and below an identified row that matches certain stored parameters. The row most likely to contain a barcode is read. Only a single barcode can be identified on a document page.

Another prior technique for determining barcode location is disclosed in commonly owned co-pending Lee et al, U.S. Patent Application Ser. No. 07/289,662 filed Dec. 22, 1988, now U.S. Pat. No. 4,948,955. The techniques there disclosed locate the barcode at any position or direction using an initial down-sampling to a coarse resolution thereby to reduce the time required for location determination at a sacrifice of image resolution.

SUMMARY OF INVENTION

It is an object of the present invention to provide a novel process which has improved resolution and can be executed in a short time period to provide an improved capability of locating one or more barcodes on a background. The method involves modifying any barcode image to eliminate all spaces between the bars and removing large clutter in an image that has been down-sampled by a relatively small amount. Thereafter, the image is further downsampled to speed up the process of small clutter removal and the determination of a centroid location of each barcode image. The centroid data is up-scaled and used to identify all actual barcode locations for use in a barcode reader.

In producing a barcode image free of spaces, the present invention uses two particularly down-sampled images, one being over-sampled and the other being under-sampled. Both images are modified so that in the under-sampled image, all pixels of the barcode are deleted whereas in the modification to the over sampled image, all spaces in the barcode are deleted to form a solid rectangle. Subtracting the two images to delete all common areas reliably leaves a solid barcode image while removing large clutter. Small clutter that remains and further clean-up can be quickly accomplished after the second down-sampling.

The foregoing features and other objects of the invention will become more fully apparent from the claims and from the description when read in conjunction with the appended drawings.

DETAILED DESCRIPTION OF INVENTION

Figure 1:
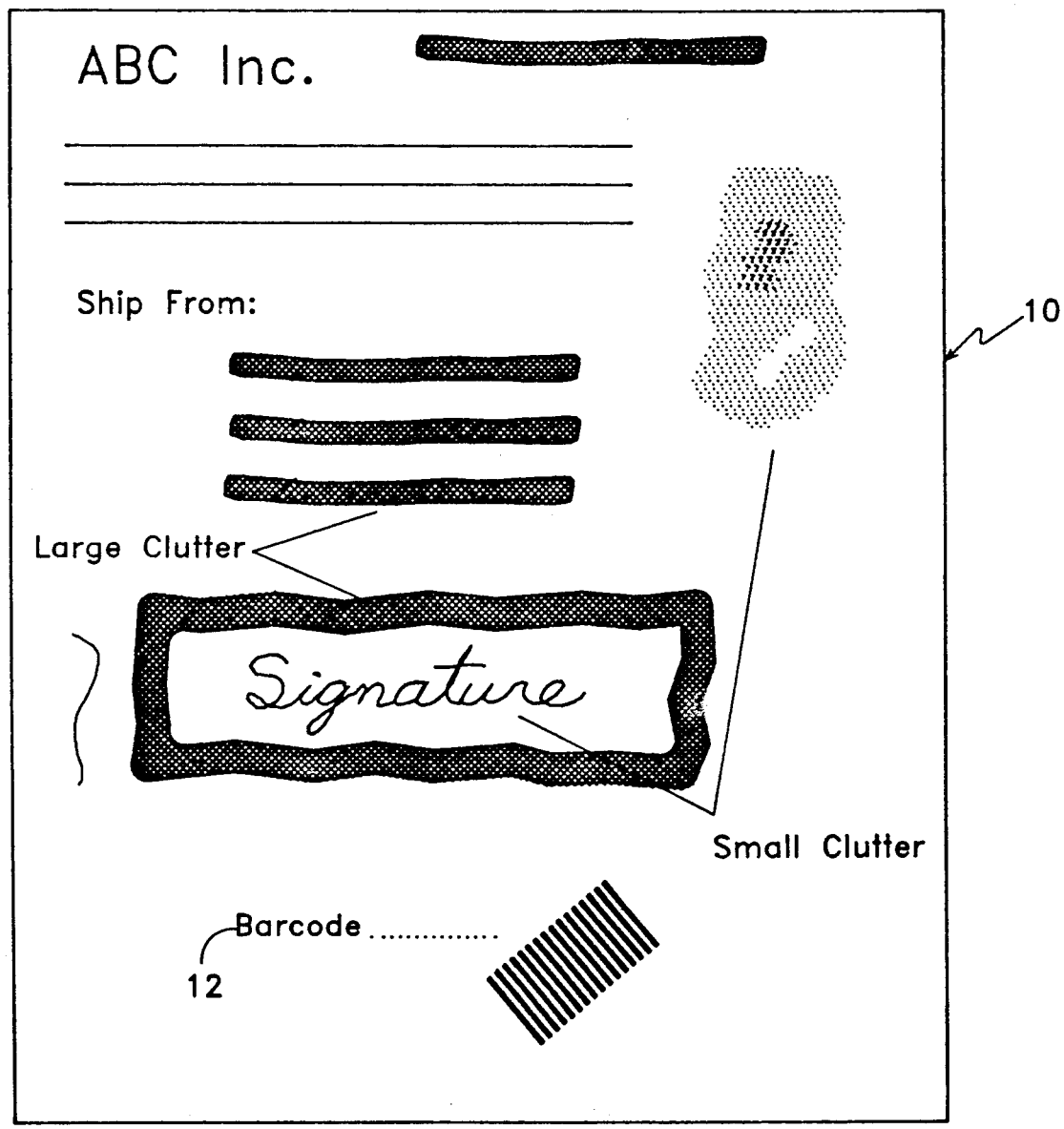
FIG. 1 is a view of a document having a randomly positioned barcode.

The invention will be described in connection with a document that may be a page 10 as illustrated in FIG. 1 having a size of 8.5"×14" and a barcode 12. However, the invention is applicable to locating the position of each barcode, in the event more than one barcode is present, on a background of any size that can be viewed with appropriate equipment that converts a visible image into a data format using pixels.

The barcode 12 consists of bars separated by spaces and represents a block of uniform area within a known shape, usually a polygonal shape that is customarily rectangular. The location of the barcode block 12 on a document 10 is variable and its major axis may have a random orientation with respect to marginal edges of the document 10.

The document 10 usually has printed matter which may include logos and other blocks of printing that are at least as large as the barcode block 12 which is referred to herein as a large clutter. Other areas of printed matter may include small print in lines of thin texts, border lines or signatures, which is referred to herein as small clutter. These documents are commonly used, for example, in the transport industry and receiving stations have barcode readers that are used for converting the barcode data into appropriate signals that are used in a data processing system.

One problem which introduces delay into the processing of these documents relates to finding the barcode 12 that is on the document. Scanners conventionally have a resolution of 200 pixels per inch. The barcode 12 may be in any location or orientation on the document and the background content of the document is arbitrary.

No feature of the barcode block, which frequently is on a label having an adhesive on its back surface, may be used to determine its location other than its size and shape of the rectangular area containing the bars and spaces. The location accuracy must be adequate to allow barcode reading by a suitable barcode reader such as that disclosed in a commonly owned copending application Ser. No. 07/289,663 filed Dec. 22, 1988, now abandoned.

A first step in the process according to the invention is to produce an image of the block containing the barcode at its location on the document. This image should be free of background noise that would generate false readings from the barcode reader.

A preferred procedure according to one feature of the present invention involves producing down-sampled images of the document by reducing the number of pixels from 200 per inch to, for example, 50 new pixels per inch which would be a reduction by a factor of four. Each new pixel is referred to as a sub-pixel.

Figure 2:
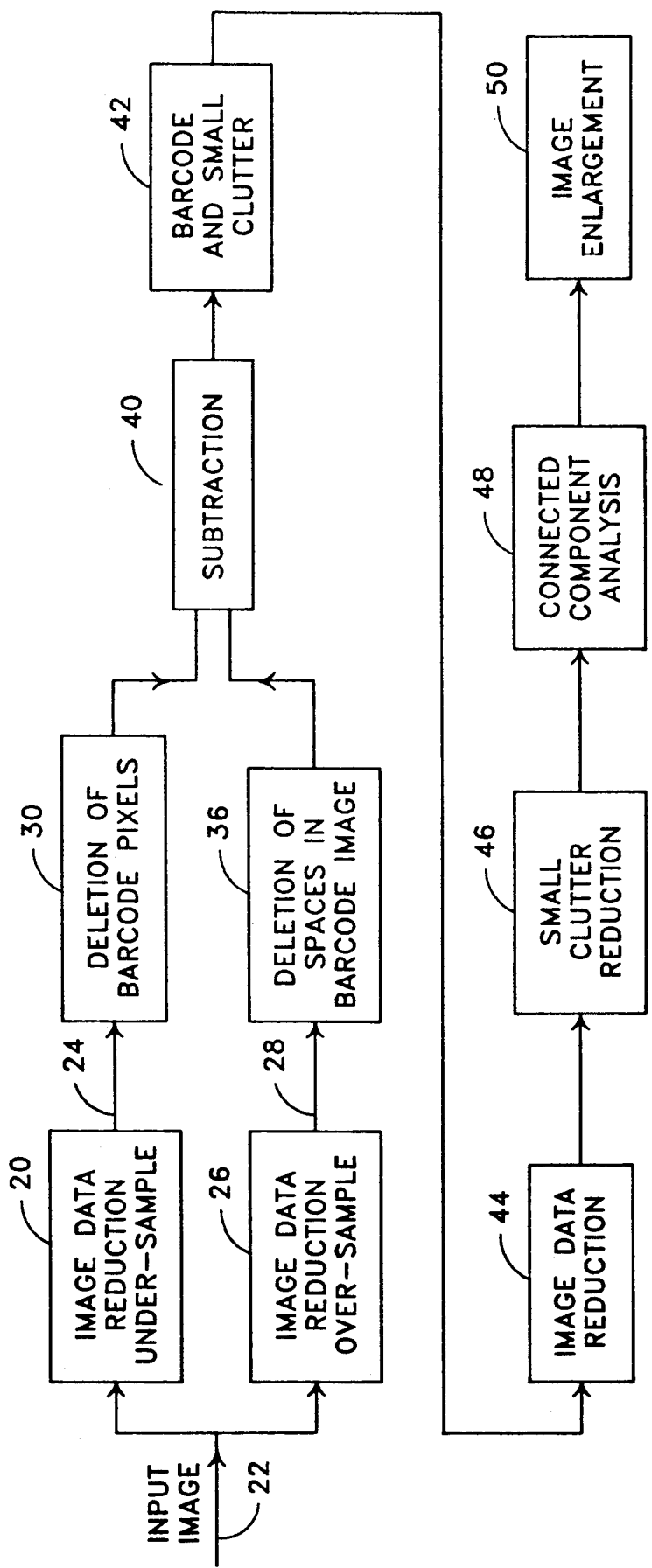
FIG. 2 is a block diagram of a system for determining the location of a barcode block.
Figure 3:
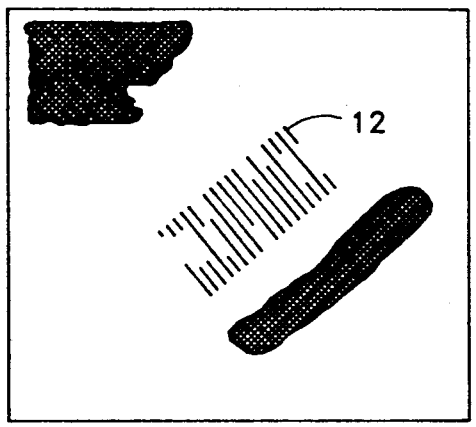
FIG. 3 is a view of a down-sized image that has been undersampled.

In FIG. 2, this reduction or down-sizing is illustrated as accruing in a first stage 20 where the image is under-sampled. Sub-pixels in the output image are equal to one only if all four of the pixels in the input image signal on line 24 are one. FIG. 3 illustrates a down-sized image which is under-sampled and is available on line 24. It should be noted that barcode lines are of reduced clarity.

Figure 4:
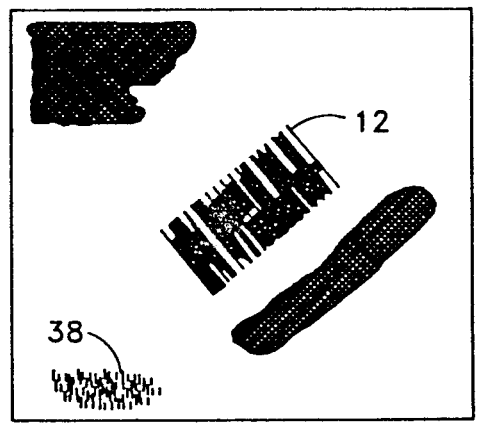
FIG. 4 is a view of a down-sized image which has been oversampled.

At a second stage 26 which is in parallel with the first stage 20, the down-sized image is over-sampled. Sub-pixels in the output image are equal to one if any of the four pixels in the input image signal on line 22 is one. FIG. 4 illustrates a down-sized image over-sampled and is available on line 28. Here spaces in the barcode are partially lost.

Figure 5:
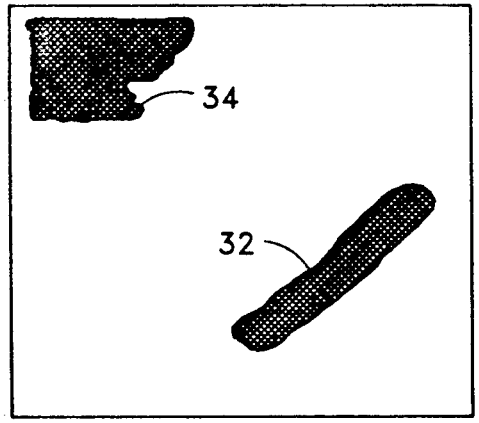
FIG. 5 is a view of the image of FIG. 3 that has been modified to remove 11 pixels representing the barcode.

To reliably guarantee that each barcode block that is on the document is preserved, the under-sampled image is first subjected to a process such as morphological erosion in block 30 of FIG. 2 such that each pixel in the barcode of FIG. 3 is rejected. This means that a barcode free image is produced as illustrated in FIG. 5. Large clutter objects 32 and 34 remain which is advantageous. To effect this morphological erosion, a 5×5 pixel structuring element may be done on the under-sampled FIG. 3 image to remove all pixels that may have been part of the barcode 12.

Figure 6:
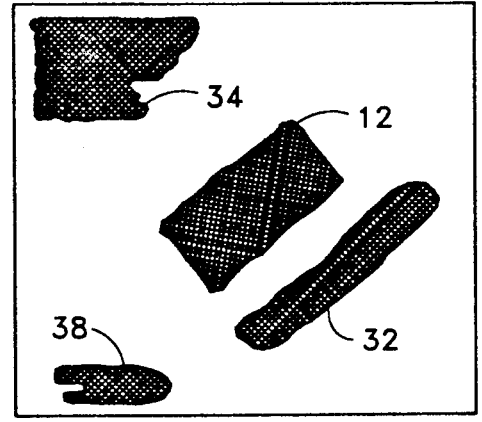
FIG. 6 is a view of the image of FIG. 4 that has been modified to remove all spaces in the barcode so that the barcode appears as a solid rectangle.

The next step at stage 36 of FIG. 2 is to operate on the FIG. 4 image to remove all spaces in the barcode image so that the barcode is presented as a solid rectangle as shown in FIG. 6. Clearly, the large clutter objects remain in the FIG. 6 image and small clutter 38 from the FIG. 4 image is retained. The small clutter 38 is not retained in FIG. 5. To effect the morphological dilation, a 5×5 pixel structuring element may be used.

Figure 7:
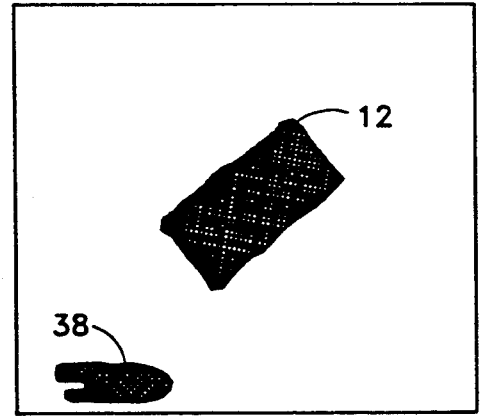
FIG. 7 is a view resulting from the subtraction of the FIG. 5 image from the FIG. 6 image thereby to show the solid barcode rectangle its actual position on the document.
Figure 8:
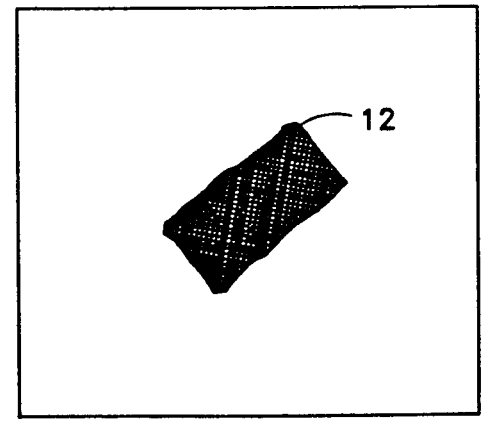
FIG. 8 is a view where the small clutter has been removed.

Thereafter, the image of FIG. 7 is obtained by subtracting the FIG. 5 image from the FIG. 6 image as indicated in block 40 of FIG. 2. The large clutter objects 32 and 34 are rejected. The barcode block 12 of FIG. 6 is retained along with the small clutter regions 38 of FIG. 4 that were connected in the dilation step which form the image of FIG. 6 as indicated by block 42 of FIG. 2.

An advantageous feature of the present invention is that at this point a second image down-sampling to one quarter size may be effected by image data reduction stage 44 so that a document that is 1/16th of the original document size can be used. This reduces the time required to execute succeeding morphological operations since the execution time is linearly proportional to image size. However, down-sizing to 1/16th of the original document size before obtaining a solid barcode block image has been found to give unreliable results.

Small clutter rejection as indicated by block 46 is next carried out as by use of a morphological opening with a disk of radius 9. Such clutter objects 38 are too small to be barcodes.

Clutter objects sometimes remain and additional steps that can be taken include making an area test, a line-run length test and an extreme boundary test. In addition, the centroid of a barcode image is needed to identify its orientation and aid in calculating the extreme corner positions.

At stage 48 of FIG. 2, the connected areas of each remaining object image are analyzed to determine the centroid, an area, a bounding box, a major axis moment, a minor axis moment, and an angle with respect to the horizontal axis. This information is used to distinguish real barcode rectangles from clutter objects. The expected values and tolerances for the following test are determined empirically.

Run-length encoding involves connected components which are sets of pixels in the image that are all connected by a path of pixels that are within one pixel of each other. A table of objects is generated by scanning the image one line at a time from the first to the last line in the image. For each line, the algorithm locates pixels connected in a line (run-lengths). The run-lengths for a line are compared to the run-lengths for the previous line to up-date object information. The run-data (start pixel and length) are used to calculate geometrical properties of the object.

An area test eliminates objects from the image that do not fall within a small percentage of the expected area of a genuine barcode image. The area of an object is equal to the number of pixels in the connected area of the object. This value is determined by adding the lengths of all runs that are part of the object and deviations from the predetermined number in the barcode block indicate clutter. This test typically eliminates objects resulting from a large area of small clutter in the document such as a paragraph of very fine print.

The angle between a major axis of each remaining object and the horizontal axis is calculated from the second moment of the object about its major axis. Using this angle and the dimensions of the barcode, a calculation is made of the extreme x and Y values a valid barcode object should attain. Testing the extreme values of an object will eliminate objects that have the correct area but the wrong shape. At this point in the process, few if any clutter objects remain.

A shape disk may be used which compares the ratio of moments about the major and minor axis within accepted limits based on the rectangular shape of the barcode. This is an even more restrictive shape test in that it is sensitive to objects that are not rectangles, but which otherwise might pass all previous tests.

Finally, the centroid of the barcode that has earlier been found during the connected component analyses is up-scaled by 16 as indicated at image enlargement stage 50 of FIG. 2. By this step, the centroid is obtained in the full resolution image. The centroid and the angle of its major axis with respect to the horizontal axis are then used to calculate the position of the four corners of the full resolution barcode image. These parameters are passed to a barcode reading program such as that described in application Ser. No. 07/289,663 identified above.

In summary, the present invention may be characterized by providing a barcode image in which all spaces are obliterated to provide a solid mark in contrast with the background. This mark is located and oriented in its actual position. Larger clutter is rejected when the solid mark is formed. Thereafter, a further down-sizing can be used to reduce data processing time and small clutter rejected thereby leaving objects that are about the size of the barcode. Object area comparisons with the known barcode size allows removal of some additional clutter and the step of determining centroids of the remaining objects allows rejection of improperly shaped objects and identification of the orientation and corner points of the barcode image which is up-sized to its original image size.

While the present invention has been described with reference to a particular system, other variations and modifications will occur to those skilled in the art. Such variations and modifications as fall within the scope of the claims or equivalents thereof are intended to be covered thereby.

I claim:

1. A method of determining the location of a barcode block having a predetermined size and shape on a document having extraneous printed matter thereon comprising:

receiving a digital image of a scanned document as an input signal;
   reducing the input signal to produce a first down-sampled image that is over-sampled;
   reducing the input signal to produce a second down-sampled image that is under-sampled;
   deleting barcode image pixels from the under-sampled image to produce a barcode free image;
   subtracting the barcode free image from the over-sampled image to produce an image definitely showing the barcode block location but not showing large sized background clutter that is common to the barcode free image and the over-sampled image; and
   down-sampling the barcode block location containing image and thereafter removing small sized background clutter thereby to produce an image showing the barcode block location which is substantially free of background clutter.

2. The method of claim 1 wherein the over-sampled and undersampled images are respectively produced by:

forming one sub-pixel from four pixels from the original image with said one sub-pixel being a 1 if any of the said four original image pixels are a 1; and
   forming one sub-pixel from four pixels from the original image with said one sub-pixel being a 1 only if all of said four original pixels are a 1.

3. The method of claim 1 further including the step of modifying the over-sampled image to connect all bars in a barcode into a single rectangular area prior to the subtracting step.

4. A method of determining the location of all barcode blocks having a predetermined size and shape on a background area that is scanned to produce an image of the area in a data format comprising the steps of:

reducing input image data into two down-sampled images, one being under-sampled and the other being over-sampled;
   modifying the two down-sampled images so that an image of each barcode block is positively provided in a third image and positively not present in a fourth image;
   subtracting the fourth image from the third image to produce a fifth image that contains the barcode block and unwanted small clutter but is free of clutter present in both the third and fourth images; and
   thereafter removing the unwanted small clutter from the fifth image to provide a sixth image containing only the barcode block.

5. A method of claim 4 wherein the removal of unwanted small clutter from the fifth image includes the step of providing a disk having a radius of a predetermined number of pixels that is effective to eliminate images of objects forming small clutter that are smaller than the barcode block.

6. A method of detecting the location of a barcode having a predetermined size and polygonal shape on a background containing printed matter for subsequent reading of the barcode comprising:

reducing by a first reduction factor input image data of the background and barcode to produce a first over-sampled image and a second under-sampled image;
   removing all pixels that form the barcode by morphological erosion from the under-sampled image to produce a modified under-sampled image;
   connecting all bars in a barcode into a single area having said polygonal shape by morphological dilation from the over-sampled image to produce a modified over-sampled image; and
   subtracting said modified under-sampled image from the modified over-sampled image to produce a new image that contains the barcode shape at its position on the background, said new image being free of large size clutter that is part of both the under-sampled image and the over-sampled image.

7. The method of claim 6 wherein the morphological erosion comprises use of a $5 \times 5$ pixel structuring element to remove all pixels that may have been part of a barcode and the morphological dilation comprises use of a $5 \times 5$ pixel structuring element that is effective to connect all bars in a barcode into a single rectangular area.

8. The method of claim 7 comprising the further steps of:

reducing by a second reduction factor said new barcode containing image to reduce the processing time for subsequent steps including removal of small, size clutter and analyzing data involving connected pixels of an object.

9. The method of claim 8 wherein the connected pixel object analysis comprises:

detecting sets of pixels in said new barcode containing image that are all connected by a path of pixels that are within one pixel of each other;
   determining the direction and location in said image of a centroid of each object including said barcode image;
   rejecting objects that do not have a barcode shape; and
   up-scaling the new barcode containing image to provide location of the centroid in a full resolution image and enable calculation of the position of the corners of the full resolution barcode image.

10. A method of reducing clutter from a document image containing printed matter including at least one barcode having dark bars and blank spaces in a configuration having a predetermined shape and area comprising:

generating a pixel based image of said at least one barcode in a data generated pixel based image of the document in which printed matter appears as objects and all bars of the barcode appear as an object comprised of a solid bar without spaces and having said predetermined shape;
    forming a table of said objects in said pixel based image including at least one barcode and clutter, each of said objects having an area with the object area being defined by the number of pixels in the area; and eliminating from the pixel based image all objects which have a number of pixels that differs by more than a predetermined amount from the number of pixels in the area of a genuine barcode image.

11. The method of claim 10 further comprising eliminating from the pixel based image all remaining objects having a linear dimension which exceeds a dimension of a genuine barcode image.

12. The method of claim 10 wherein the pixel based image containing a barcode in which all bars appear as a solid bar without spaces is generated by:

reducing input image data from an original document into two down-sampled images, one being under-sampled and the other being over-sampled;

modifying the two down-sampled images so that an image of the barcode block is positively provided in a third image and positively not present in a fourth image;

subtracting the fourth image from the third image to produce a fifth image that contains the barcode block and unwanted small clutter but is free of clutter present in both the third and fourth images; and thereafter removing the unwanted small clutter from the fifth image to provide a sixth image including the barcode and objects not removed as large clutter or small clutter.

13. A method of claim 12 wherein the removal of unwanted small clutter from the fifth image includes the step of utilizing a disk having a radius of a predetermined number of pixels that is effective to eliminate images of objects that are smaller than the barcode block.

* * * * *